United States Patent
Grayson, II et al.

(10) Patent No.: US 6,464,273 B2
(45) Date of Patent: Oct. 15, 2002

(54) FOOT PLATE ATTACHMENT FOR A SHOVEL

(75) Inventors: Henry C. Grayson, II, Plano; Wayne R. Shaw, Richardson, both of TX (US)

(73) Assignee: Outdoor Intelligence Corporation, Dallas, TX (US)

( * ) Notice: Subject to any disclaimer, the term of this patent is extended or adjusted under 35 U.S.C. 154(b) by 0 days.

(21) Appl. No.: 09/825,319

(22) Filed: Apr. 3, 2001

(65) Prior Publication Data

US 2002/0140241 A1 Oct. 3, 2002

(51) Int. Cl.[7] .................................................. A01B 1/00
(52) U.S. Cl. ........................................................ 294/60
(58) Field of Search ............................. 294/49, 59, 60; 76/113; 254/131.5

(56) References Cited

U.S. PATENT DOCUMENTS

| | | | | | |
|---|---|---|---|---|---|
| 536,230 | A | * | 3/1895 | Page ........................... | 294/60 |
| 678,373 | A | * | 7/1901 | Blaser ......................... | 294/60 |
| 754,543 | A | * | 3/1904 | Christiansen ................ | 294/60 |
| 1,018,424 | A | * | 2/1912 | Jewett ......................... | 294/60 |
| 1,198,930 | A | * | 9/1916 | Krentel ....................... | 294/60 |
| 5,503,445 | A | * | 4/1996 | Fontaine ..................... | 294/60 |

* cited by examiner

Primary Examiner—Dean J. Kramer
(74) Attorney, Agent, or Firm—John E. Vandigriff

(57) ABSTRACT

A foot plate attachment for a shovel which has a pressure plate that resides on the top of the shovel blade, and has a support piece under the pressure plate. The support may be integrally secured to a shovel at the time the shovel is manufactured, or may be attached to a shovel that did not originally have a plate attached. The foot plate may be attached by welding, screws, rivets or by an adhesive. Alternatively, the foot plate may have tabs extending from a portion of the plate that may be bent under the original foot surface on the shovel to hold the plate in position. the attachment is held in place when secured to the insert.

6 Claims, 3 Drawing Sheets

FOOT PLATE ATTACHMENT FOR A SHOVEL

FIELD OF THE INVENTION

The invention relates to shovel and digging instruments, and more particularly to a foot plate attachment for a shovel.

BACKGROUND OF THE INVENTION

Shovels have a formed blade with a portion of the top of the blade is reinforced or folded over to provide a reenforced portion to which a foot is applied to force the shovel blade into the ground. A portion of the blade material is formed above the area to which the foot is applied to hold a handle, and below the portion formed to hold the blade is a recess or irregular area to reenforce the blade. If the ground is compacted or a clay soil, it is difficult to force the blade into the ground and the narrow reenforced folded portion may apply excess pressure on the foot through the sole of the shoe.

U.S. Pat. No. 5,901,996, describes a foot plate attachment that is similar to that described in U.S. Pat. No. 5,502,445, and uses a hose clamp to hold the attachment to the shovel handle.

U.S. Pat. No. 5,502,445, utilizes a plate which resides on the portion of the shovel to which the foot applies pressure during digging, and a curved portion extends upward partially around the shovel handle and is attached thereto by a U-bolt.

While both of the above described foot plate attachments, but neither describes a means to prevent the foot plate attachment from moving upward if the hose clamp or U-bolt becomes loose.

SUMMARY OF THE INVENTION

The invention is to a foot plate attachment which has a pressure plate that resides on the top of the shovel blade, and has a support piece under the pressure plate. The support may be integrally secured to a shovel at the time the shovel is manufactured, or may be attached to a shovel that did not originally have a plate attached.

The foot plate may be attached by welding, screws, rivets or by an adhesive. Alternatively, the foot plate may have tabs extending from a portion of the plate that may be bent under the original foot surface on the shovel to hold the plate in position.

With the foot plate attached to the shovel, a large area is provided to press downward upon by the foot, both side and back, to help add an increased downward digging pressures, and provides a more stable area so that the shovel will not turn or rotate with the applied downward pressure.

BRIEF DESCRIPTIONS OF THE DRAWINGS

DESCRIPTION OF A PREFERRED EMBODIMENT

Figure 1:
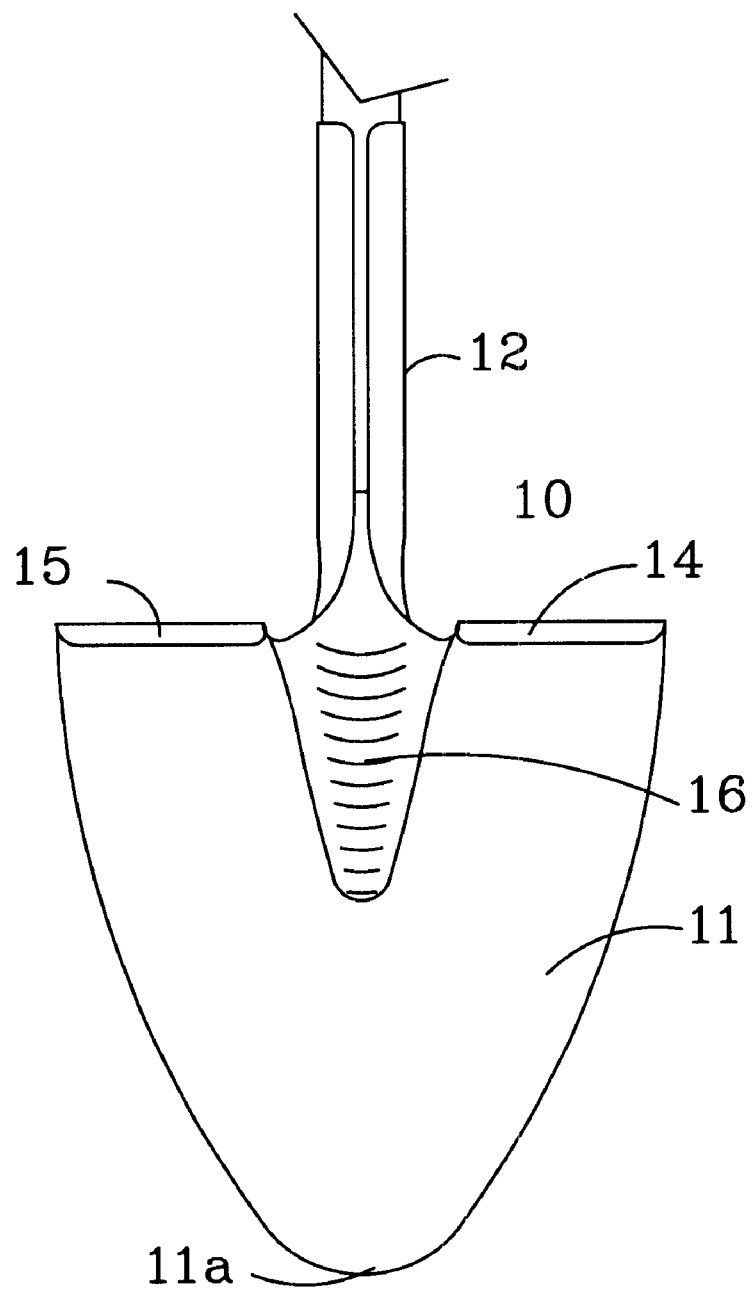
FIG. 1 shows a prior art shovel

FIG. 1 shows a prior art shovel 10 which is formed from a single piece of metal, with a blade 11 having shoulders 14 and 15 which are formed by bending two separated edges to present a wider surface for applying pressure with the foot when digging with the shovel. Another portion of the shovel 12 is bent to form a partially closed cylinder into which a handle is inserted. To add strength to the shovel blade, a concave region 16, as viewed from the back of the shovel blade 11, is formed just below the handle area 12, and between the two shoulders 14 and 15.

When digging in hard earth, a lot of pressure must be placed on one of shoulders 14 and 15 to press the tip 11a of blade 11 into the earth. Since shoulders 14 and 15 have a narrow top surface, it is at times difficult to apply sufficient pressure on either shoulder 14 or 15 to press the blade 11 into the earth without applying undue pressure on the bottom of the foot. Also, when digging in hard earth, the shovel blade tends to pivot to the right or left if the foot is moved tangential to the ground.

Figure 2:
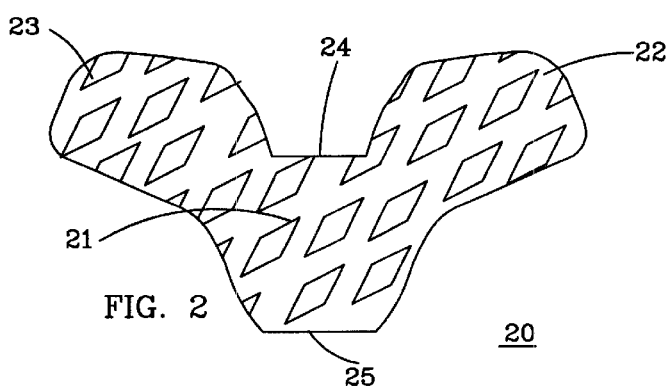
FIG. 2 is a top view of the foot plate.

FIG. 2 shows a top view of an attachment plate 20 that is to be attached to a shovel over the foot pressure shoulders 14 and 15 as illustrated in FIG. 1. Plate 20 has a top flat area which has two elongated areas 22 and 23 that extend away from opening 24, through which the shovel handle is inserted. Plate 20 has a flat area 25 that extends from notched area 24. Plate 20 may have a textured or ribbed surface to provide friction so that when a foot is placed on plate 20, it does not slide on the surface of plate 20.

Figure 3:
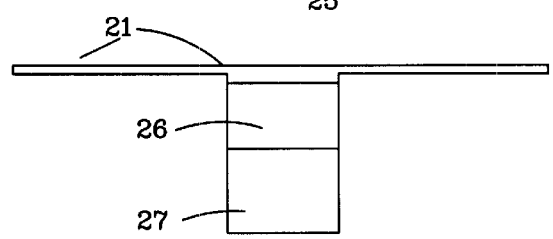
FIG. 3 is a back view of the foot plate.

FIG. 3 is a back view of plate 20 showing that it is a flat plate and has a two section brace tab 26 and tab 27 extending downward.

Figure 4:
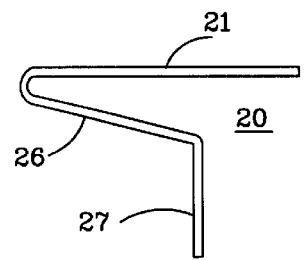
FIG. 4 is an end view of the foot plate.

FIG. 4 is a side view of foot support 20 showing its flat top surface 21 and brace tabs 26 and 27. Brace tab 26 is angled downward toward the approximate center of plate 21. Brace tab 27 angles downward adjacent to opening 24 in of plate 21.

Figure 5:
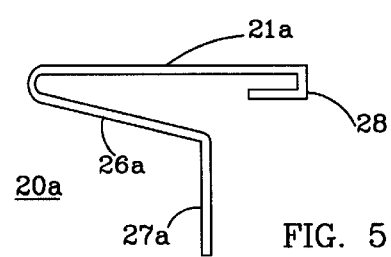
FIG. 5 is an end view of a modified self attaching foot plate.

FIG. 5 is a side view of modified plate 20a. A portion of each of parts 22 and 23 (FIG. 2), may be bent downward and back after the plate is mounted on a shovel to secure the foot plate to the shovel. This is illustrated below with reference to FIG. 8.

Figure 6:
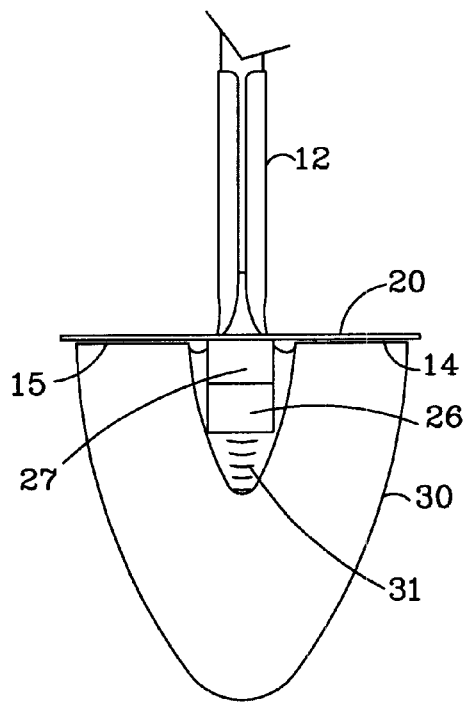
FIG. 6 shows the foot plate of FIGS. 2–4 on a shovel.

FIG. 6 Shows plate 20 mounted on shovel 10, with plate 20 on the two shoulders 14 and 15. Shovel handle 12 extends up through opening 24 of plate 20. Plate 20 is placed on shovel 10 by placing plate on shovel, and then attaching plate 20 by welding, riveting, bolting or gluing each of the under sides of area 22 and 23 to shoulders 14 and 15, respectively, and attaching tab 27 to the back of the shovel.

Figures 7, 8:
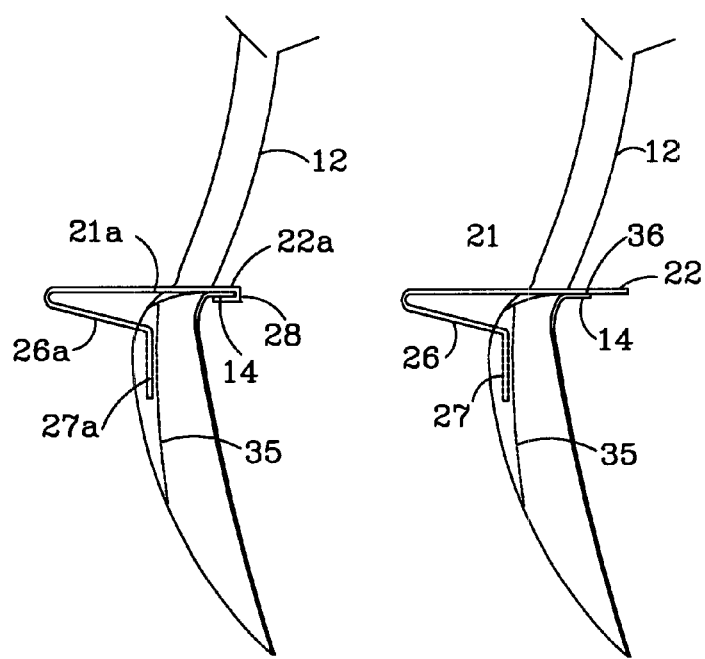
FIG. 7 is a side view of FIG. 6.
FIG. 8 is a side view of a shovel with the self-attaching foot plate of FIG. 5 mounted on the shovel.

FIG. 7 is a side view of shovel 10 and plate 20. The tab 27 is attached in the recess 35 in the shovel, and area 22 is attached to shoulder 14 at 36.

FIG. 8 is a side view of a shovel with the self-attaching foot plate 21a attached in place. In this embodiment, foot plate 21a has tab 28 bent under shovel shoulder 14. Also there is a similar shoulder bend under shovel shoulder 15 (not illustrated) The plate is placed on the shovel and then the tabs are bent under the shovel shoulders. This holds the foot plate in position. The foot plate cannot move upward because of the tabs under the shoulders. It cannot move laterally because of tab 27a, and because the tabs (28) are bent under the shovel shoulders.

What is claimed is:

1. An attachment device for a shovel-having a blade with front and back sides, a pair of shoulders on the blade and a handle mounted in a cylinder extending upward from the blade and shoulders, comprising:

- a plate having two elongated areas separated by an opening positioned partially around the shovel handle, said plate having a central portion, joining said two elongated areas, and extending outward from the back side of the shovel; and
- a support tab under said plate central portion angled toward and downward against the back side of the shovel blade.

2. The attachment device according to claim 1, wherein the foot plate is attached to the shovel by at least one of welding, screws, adhesive, and bending tabs partially around the pair of shoulders.

3. The attachment device according to claim 1, wherein said plate has a textured surface to prevent a foot, when applied to the plate, from slipping on the plate.

4. An attachment device for a shovel having a blade, a pair of shoulders on the blade and a handle mounted in a cylinder extending upward from the blade and shoulders, comprising:

- a plate having two elongated areas separated by an opening positioned partially around the shovel handle, said plate having a central portion, joining said two elongated areas, and extending outward from the back side of the shovel; and
- a support tab under said plate central portion angled toward and downward against the back side of the shovel blade; and
- a pair of tabs for securing the plate to the shovel shoulders.

5. The attachment device according to claim 4, wherein the foot plate is attached to the shovel by at least one of welding, screws, adhesive, and bending tabs partially around the pair of shoulders.

6. The attachment device according to claim 5, wherein said plate has a textured surface to prevent a foot, when applied to the plate, from slipping on the plate.

* * * * *